United States Patent
Jeong et al.

(10) Patent No.: US 10,225,860 B2
(45) Date of Patent: Mar. 5, 2019

(54) CHANNEL ACCESS METHOD AND DEVICE IN WIRELESS LAN SYSTEM

(71) Applicant: KT Corporation, Seongnam-si, Gyeonggi-do (KR)

(72) Inventors: Yang Seok Jeong, Seoul (KR); Joo Young Kim, Seoul (KR)

(73) Assignee: KT Corporation, Seongnam-si (KR)

(*) Notice: Subject to any disclaimer, the term of this patent is extended or adjusted under 35 U.S.C. 154(b) by 0 days.

(21) Appl. No.: 14/902,450

(22) PCT Filed: Jul. 2, 2014

(86) PCT No.: PCT/KR2014/005909
§ 371 (c)(1),
(2) Date: Dec. 31, 2015

(87) PCT Pub. No.: WO2015/002462
PCT Pub. Date: Jan. 8, 2015

(65) Prior Publication Data
US 2016/0381702 A1    Dec. 29, 2016

(30) Foreign Application Priority Data
Jul. 2, 2013   (KR) ...................... 10-2013-00777265

(51) Int. Cl.
*H04J 1/16*    (2006.01)
*H04W 74/00*   (2009.01)

(52) U.S. Cl.
CPC ................................ *H04W 74/006* (2013.01)

(58) Field of Classification Search
CPC .................................................. H04W 74/006
See application file for complete search history.

(56) References Cited

U.S. PATENT DOCUMENTS

| 7,813,275 B2 | 10/2010 | Yamada et al. |
| 9,661,659 B2* | 5/2017 | Choi ................. H04W 74/0816 |
| 2005/0003774 A1* | 1/2005 | Austman ................. G01S 1/024 |
| | | 455/151.2 |

(Continued)

FOREIGN PATENT DOCUMENTS

| CN | 1744550 A | 3/2006 |
| KR | 10-2009-0059824 A | 6/2009 |

(Continued)

OTHER PUBLICATIONS

Azadeh Ettefagh et al., "On the Range Performance of Decode-and-Forward Relays in IEEE 802.11 WLANS", the 17th Annual IEEE International Symposium on Personal, Indoor and Mobile Radio Communications (PIMRC'06), Sep. 11-14, 2006, 6pgs.

(Continued)

*Primary Examiner* — Jay P Patel
(74) *Attorney, Agent, or Firm* — Sughrue Mion, PLLC

(57) ABSTRACT

Disclosed are a channel access method and device in a wireless LAN system. The channel access control method comprises the steps of: receiving, from a main-access point, a main-beacon frame including information on an limited access section in which a channel access of an end terminal connected to a relay device is limited; generating a relay-beacon frame including the information on the limited access section; and transmitting the relay-beacon frame. Thus, the efficiency of using a wireless channel can be improved.

11 Claims, 21 Drawing Sheets

(56) References Cited

U.S. PATENT DOCUMENTS

| | | | |
|---|---|---|---|
| 2005/0030967 A1* | 2/2005 | Ohmi | H04W 12/08 |
| | | | 370/445 |
| 2005/0195771 A1* | 9/2005 | Matsunaga | H04W 56/0015 |
| | | | 370/336 |
| 2006/0029028 A1* | 2/2006 | Kim | H04W 84/12 |
| | | | 370/338 |
| 2006/0128402 A1* | 6/2006 | Lee | H04W 72/082 |
| | | | 455/464 |
| 2009/0080497 A1* | 3/2009 | Wang | H04B 1/7143 |
| | | | 375/132 |
| 2009/0156130 A1* | 6/2009 | Wang | H04B 7/0408 |
| | | | 455/68 |
| 2010/0265871 A1 | 10/2010 | Ko et al. | |
| 2012/0238268 A1* | 9/2012 | Radulescu | H04W 36/0061 |
| | | | 455/435.1 |
| 2013/0003689 A1 | 1/2013 | Kwon et al. | |
| 2016/0073429 A1* | 3/2016 | Oteri | H04W 74/0816 |
| | | | 370/338 |

FOREIGN PATENT DOCUMENTS

| | | |
|---|---|---|
| KR | 10-2011-0102847 A | 9/2011 |
| WO | 2011/102652 A2 | 8/2011 |

OTHER PUBLICATIONS

Xueli an et al., "Extending WPANs to Support Multi-hop Communication with QoS Provisioning", Consumer Communications and Networking Conference (CCNC), Jan. 9-12, 2010, 7th IEEE, 7 pgs.
International Search Report for PCT/KR2014/005909 dated Nov. 3, 2014.
Seok, et al., "Uplink Channel Access General Procedure", LG Electronics, Jul. 12, 2012, pp. 1-19, IEEE 802.11-12/0831r0, (19 pages total).

* cited by examiner

FIG. 6

| ELEMENT ID | LENGTH | DTIM COUNT | DTIM PERIOD | BITMAP CONTROL | PARTIAL VIRTUAL BITMAP |
|---|---|---|---|---|---|
| 1 | 1 | 1 | 1 | 1 | 1-251 |

OCTET:

FIG. 15

| RAW PARAMETER SET IE |
|---|
| R-BSS ACCESS RESTRICTION REQUEST |
| SAME GROUP INDICATION |
| PRAW INDICATION |
| PAGE ID |
| RAW START AID |
| RAW END AID |
| RAW START TIME |
| RAW DURATION |
| ACCESS RESTRICTED TO PAGED STA ONLY |
| GROUP/RESOURCE ALLOCATION FRAME INDICATION |
| SOUNDING RAW |
| SLOT DEFINITION |

FIG. 16

| RAW PARAMETER SET IE |
|---|
| R-BSS ACCESS RESTRICTION REQUEST |
| RAW START TIME |
| RAW DURATION |

FIG. 19

| RAW PARAMETER SET IE |
|---|
| R-BSS ACCESS PERMISSION REQUEST |
| SAME GROUP INDICATION |
| PRAW INDICATION |
| PAGE ID |
| RAW START AID |
| RAW END AID |
| RAW START TIME |
| RAW DURATION |
| ACCESS RESTRICTED TO PAGED STA ONLY |
| GROUP/RESOURCE ALLOCATION FRAME INDICATION |
| SOUNDING RAW |
| SLOT DEFINITION |

FIG. 20

| RAW PARAMETER SET IE |
|---|
| R-BSS ACCESS PERMISSION REQUEST |
| SAME GROUP INDICATION |
| PRAW INDICATION |
| PAGE ID |
| RAW START AID (RELAY AID) |
| RAW END AID (RELAY AID) |
| RAW START TIME |
| RAW DURATION |
| ACCESS RESTRICTED TO PAGED STA ONLY |
| GROUP/RESOURCE ALLOCATION FRAME INDICATION |
| SOUNDING RAW |
| SLOT DEFINITION |

FIG. 21

| RAW PARAMETER SET IE |
|---|
| R-BSS ACCESS PERMISSION REQUEST |
| RAW START TIME |
| RAW DURATION |

CHANNEL ACCESS METHOD AND DEVICE IN WIRELESS LAN SYSTEM

TECHNICAL FIELD

The present invention generally relates to channel access technology in a wireless local area network (WLAN) system and, more particularly, to a method and device for controlling channel access by an end terminal in a WLAN system including a relay device.

BACKGROUND ART

With the development of information and communication technology, various wireless communication technologies have been developed. Among these technologies, a wireless local area network (WLAN) denotes technology for allowing wireless access to the Internet in homes, businesses or specific service areas using a mobile terminal such as a personal digital assistant (PDA), a laptop computer, a portable multimedia player (PMP), a smart phone, or a tablet PC, based on radio frequency (RF) technology.

Standards for WLAN technology have been developed as Institute of Electrical and Electronics Engineers (IEEE) 802.11 standards. WLAN technology conforming to the IEEE 802.11a standard is operated based on an orthogonal frequency division multiplexing (OFDM) scheme, and is capable of providing a maximum data rate of 54 Mbps in a 5 GHz band. WLAN technology conforming to the IEEE 802.11b standard is operated based on a direct sequence spread spectrum (DSSS) scheme, and is capable of providing a maximum data rate of 11 Mbps in a 2.4 GHz band. WLAN technology conforming to the IEEE 802.11g standard is operated based on the OFDM or DSSS scheme, and is capable of providing a maximum data rate of 54 Mbps in a 2.4 GHz band.

WLAN technology conforming to the IEEE 802.11n standard is operated based on the OFDM scheme in a 2.4 GHz band and a 5 GHz band, and is capable of providing a maximum data rate of 300 Mbps for four spatial streams when a Multiple-Input Multiple-Output OFDM (MIMO-OFDM) scheme is used. WLAN technology conforming to the IEEE 802.11n standard may support a channel bandwidth of up to 40 MHz and is capable of providing a maximum data rate of 600 Mbps in that case.

As the popularization of such WLAN technology has been activated and applications using WLANs have been diversified, the requirement for new WLAN technology that supports throughput higher than that of existing WLAN technology is increasing. Very high throughput (VHT) WLAN technologies are technologies proposed to support data processing speeds of 1 Gbps or more. Among these technologies, WLAN technology conforming to the IEEE 802.11ac standard is technology for providing very high throughput (VHT) in a band of 6 GHz or less, and WLAN technology conforming to the IEEE 802.11ad standard is technology for providing VHT in a 60 GHz band.

In addition, standards for various WLAN technologies have been established, and technologies are being developed. As representatives thereof, WLAN technology conforming to the IEEE 802.11af standard is technology defined for the operation of a WLAN in TV white space, WLAN technology conforming to the IEEE 802.11ah is technology defined to support a large number of terminals operating on low power, and WLAN technology conforming to the IEEE 802.11ai standard is technology defined for fast initial link setup (FILS) in a WLAN system. Recently, in a congested environment in which multiple base stations and terminals are present, the standardization of an IEEE 802.11 high-efficiency WLAN (HEW), aimed at improving frequency use efficiency, is ongoing.

In such a system based on WLAN technology, any terminal may function as a relay device for relaying data transmitted between a master access point and an end terminal. A master basic service set (BSS), configured by the master access point, and a relay BSS, configured by the relay device, use the same channel. However, since terminals belonging to respective BSSs refer to different beacon frames, access to the channel by terminals belonging to the relay BSS is not restricted by a restricted access window (RAW) parameter set (RPS) included in a beacon frame transmitted by the master access point.

DISCLOSURE

Technical Problem

An object of the present invention to solve the above problems is to provide a method for controlling channel access by an end terminal belonging to a relay BSS in a WLAN system including a relay device.

Another object of the present invention to solve the above problems is to provide a device for controlling channel access by an end terminal belonging to a relay BSS in a WLAN system including a relay device.

Technical Solution

A channel access control method according to an embodiment of the present invention to accomplish the above objects includes receiving, from a master access point, a master beacon frame that includes information about a restricted access interval during which channel access by an end terminal connected to a relay device is restricted, generating a relay beacon frame that includes the information about the restricted access interval, and transmitting the relay beacon frame.

Here, the information about the restricted access interval may include an indicator indicating that channel access by the end terminal connected to the relay device is restricted, a start point of the restricted access interval, and a duration of the restricted access interval.

Here, the information about the restricted access interval may be included in a restricted access window (RAW) parameter set.

Here, the relay device may transmit and receive data to and from the master access point during the restricted access interval.

Here, channel access by a terminal associated with the master access point may be restricted during the restricted access interval.

Here, channel access by the end terminal connected to the relay device may be restricted during the restricted access interval.

A channel access control method according to another embodiment of the present invention to accomplish the above objects includes receiving, from a master access point, a master beacon frame that includes information about a permitted access interval during which channel access by an end terminal connected to a relay device is permitted, generating a relay beacon frame that includes the information about the permitted access interval, and transmitting the relay beacon frame.

Here, the information about the permitted access interval may include an indicator indicating that channel access by the end terminal connected to the relay device is permitted, a start point of the permitted access interval, and a duration of the permitted access interval.

Here, the information about the permitted access interval may be included in a restricted access window (RAW) parameter set.

Here, the relay device may transmit and receive data to and from the end terminal during the permitted access interval.

Here, channel access by the master access point may be restricted during the permitted access interval.

Here, channel access by a terminal associated with the master access point may be restricted during the permitted access interval.

Advantageous Effects

In accordance with the present invention, a master access point may extend a service area via a relay device. A terminal may secure a high-quality link via the relay device, thus enabling data to be transmitted at high speed. That is, the relay device is used, and thus the efficiency of use of a wireless channel may be improved, and the amount of power consumed by the terminal may be reduced.

Further, in a WLAN system including a relay device, when a channel access interval for a terminal belonging to a master BSS is allocated, channel access by a terminal belonging to a relay BSS may be restricted during the channel access interval. By means of this, the efficiency of use of the wireless channel may be improved.

Furthermore, a channel access interval for the transmission/reception of data between the master access point and the relay device may be allocated, and channel access by a terminal belonging to a master BSS and by a terminal belonging to a relay BSS may be restricted during the channel access interval. Accordingly, the efficiency of use of the relay device may be improved.

Furthermore, the master access point may allocate a channel access interval for a terminal belonging to a relay BSS. By means of this, the efficiency of use of a wireless channel may be improved.

DESCRIPTION OF DRAWINGS

FIG. 6 is a block diagram showing an embodiment of the structure of a TIM information element (IE);

FIG. 15 is a conceptual diagram showing the configuration of an RPS included in a master beacon frame according to an embodiment of the present invention;

FIG. 16 is a conceptual diagram showing the configuration of an RPS included in a relay beacon frame according to an embodiment of the present invention;

FIG. 19 is a conceptual diagram showing the configuration of an RPS included in a master beacon frame according to another embodiment of the present invention;

FIG. 20 is a conceptual diagram showing the configuration of an RPS included in a master beacon frame according to a further embodiment of the present invention; and FIG. 21 is a conceptual diagram showing the configuration of an RPS included in a relay beacon frame according to another embodiment of the present invention.

BEST MODE

Figure 1:
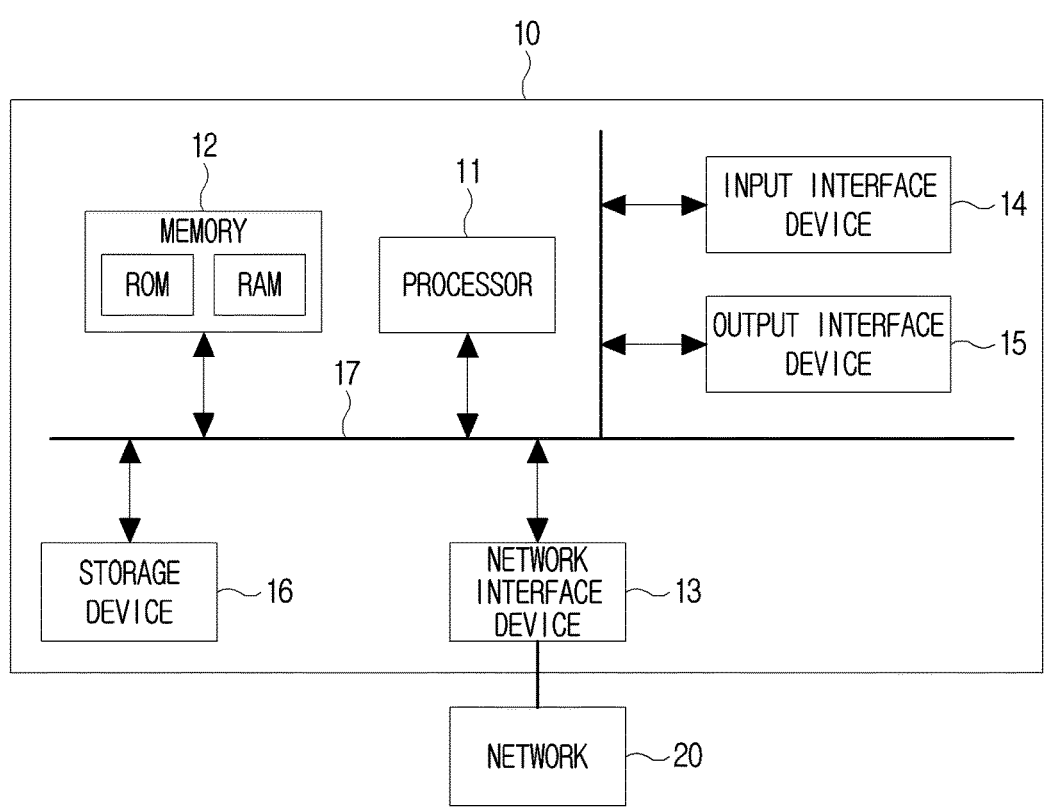
FIG. 1 is a block diagram showing an embodiment of a station for performing methods according to the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms such as "first" and "second" may be used to describe various components, but those components should not be limited by the terms. The terms are merely used to distinguish one component from other components. A first component may be designated as a second component and a second component may be designated as a first component in the similar manner, without departing from the scope based on the concept of the present invention. The term "and/or" includes a combination of a plurality of related items or any of the plurality of related items.

It should be understood that a representation indicating that a first component is "connected" or "coupled" to a second component may include the case where the first component is connected or coupled to the second component with some other component interposed therebetween, as well as the case where the first component is "directly connected" or "directly coupled" to the second component. In contrast, it should be understood that a representation indicating that a first component is "directly connected" or "directly coupled" to a second component means that no component is interposed between the first and second components.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Hereinafter, preferred embodiments of the present invention will be described in detail with reference to the attached drawings. For easy understanding of the entire part of the invention in the following description of the present invention, the same reference numerals are used to designate the same or similar elements throughout the drawings, and repeated descriptions of the same components will be omitted.

Throughout the present specification, a station (STA) denotes any functional medium that includes medium access control (MAC) conforming to the IEEE 802.11 standards and a physical layer interface for a wireless medium. Stations may be classified into a station (STA) that is an access point (AP) and a station (STA) that is a non-AP. The station that is an AP may be simply called an access point (AP), and the station that is a non-AP may be simply called a terminal.

A 'station (STA)' may include a processor and a transceiver, and may further include a user interface, a display device, etc. The processor denotes a unit devised to generate a frame to be transmitted over a wireless network or process a frame received over the wireless network, and may perform various functions to control the station (STA). The transceiver denotes a unit that is functionally connected to the processor and is devised to transmit and receive a frame over the wireless network for the station (STA).

An 'access Point (AP)' may denote a centralized controller, a base station (BS), a radio access station, a Node B, an evolved Node B, a relay, a Mobile Multihop Relay (MMR)-BS, a Base Transceiver System (BTS), a site controller, etc., and may include some or all of the functions thereof.

A 'terminal (i.e. non-AP)' may denote a Wireless Transmit/Receive Unit (WTRU), User Equipment (UE), a User Terminal (UT), an Access Terminal (AT), a Mobile Station (MS), a mobile terminal, a subscriber unit, a Subscriber Station (SS), a wireless device, a mobile subscriber unit, etc., and may include some or all of the functions thereof.

Here, the terminal may denote a desktop computer capable of communication, a laptop computer, a tablet PC, a wireless phone, a mobile phone, a smart phone, a smart watch, smart glasses, an e-book reader, a Portable Multimedia Player (PMP), a portable game console, a navigation device, a digital camera, a Digital Multimedia Broadcasting (DMB) player, a digital audio recorder, a digital audio player, a digital picture recorder, a digital picture player, a digital video recorder, a digital video player, etc.

FIG. 1 is a block diagram showing an embodiment of a station for performing methods according to the present invention.

Referring to FIG. 1, a station 10 may include at least one processor 11, memory 12, and a network interface device 13 connected to a network 20 and configured to perform communication. The station 10 may further include an input interface device 14, an output interface device 15, and a storage device 16. The components included in the station 10 may be connected to each other through a bus 17, and may then perform communication with each other.

The processor 11 may execute program instructions stored in the memory 12 and/or the storage device 16. The processor 11 may denote a central processing unit (CPU), a graphics processing unit (GPU), or an exclusive processor for performing the methods according to the present invention. Each of the memory 12 and the storage device 16 may be implemented as a volatile storage medium and/or a nonvolatile storage medium. For example, the memory 12 may be implemented as read only memory (ROM) and/or random access memory (RAM).

The embodiments of the present invention are applied to a WLAN system conforming to the IEEE 802.11 standards, and may also be applied to other communication systems as well as the WLAN system conforming to the IEEE 802.11 standards.

For example, the embodiments of the present invention may be applied to the mobile Internet such as a Wireless Personal Area Network (WPAN), a Wireless Body Area Network (WBAN), Wireless Broadband Internet (WiBro), or Worldwide Interoperability for Microwave Access (Wimax), a second generation (2G) mobile communication network such as a Global System for Mobile communication (GSM) or Code Division Multiple Access (CDMA), a 3G mobile communication network such as Wideband Code Division Multiple Access (WCDMA) or CDMA2000, a 3.5G mobile communication network such as High-Speed Downlink Packet Access (HSDPA) or High-Speed Uplink Packet Access (HSUPA), a 4G mobile communication network such as Long-Term Evolution (LTE) or LTE-Advanced, or a 5G mobile communication network.

Figure 2:
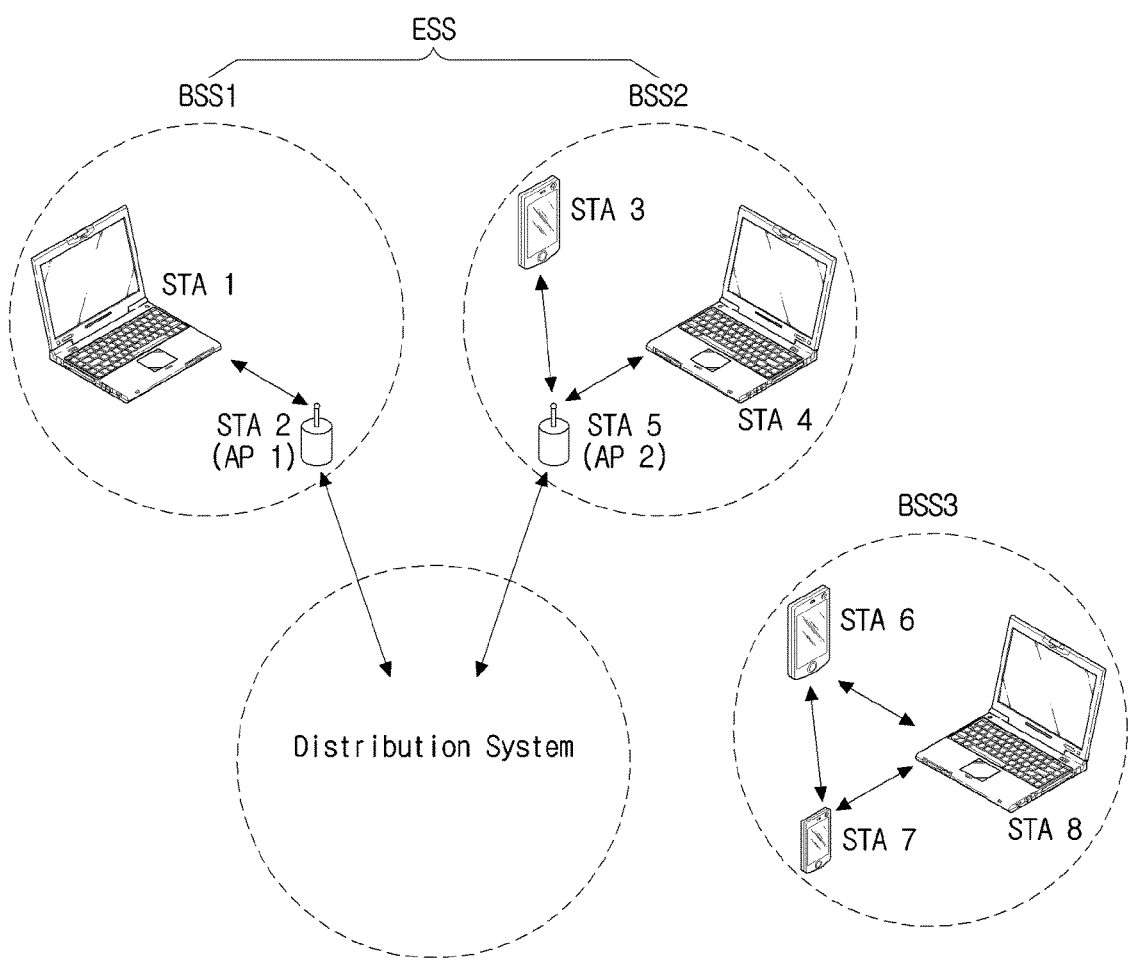
FIG. 2 is a conceptual diagram showing an embodiment of the configuration of a WLAN system conforming to IEEE 802.11.

FIG. 2 is a conceptual diagram showing an embodiment of the configuration of a WLAN system conforming to IEEE 802.11.

Referring to FIG. 2, the WLAN system conforming to IEEE 802.11 may include at least one basic service set (BSS). The BSS denotes a set of stations (STA 1, STA 2 (AP 1), STA 3, STA 4, STA 5 (AP 2), STA 6, STA 7, STA 8) which are successfully synchronized with each other and are capable of communicating with each other, and is not a concept meaning a specific area.

BSSs may be classified into an infrastructure BSS and an independent BSS (IBSS). Here, BSS 1 and BSS 2 denote infrastructure BSSs and BSS 3 denotes an IBSS.

BSS 1 may include a first terminal STA 1, a first access point STA 2 (AP 1) for providing a distribution service, and a distribution system (DS) for connecting multiple access points STA 2 (AP 1) and STA 5 (AP 2) to each other. In BSS 1, the first access point STA 2 (AP 1) may manage the first terminal STA 1.

BSS 2 may include a third terminal STA 3, a fourth terminal STA 4, a second access point STA 5 (AP 2)) for providing a distribution service, and a distribution system (DS) for connecting the multiple access points STA 2 (AP 1) and STA 5 (AP 2) to each other. In the BSS 2, the second access point STA 5 (AP 2) may manage the third terminal STA 3 and the fourth terminal STA 4.

BSS 3 denotes an IBSS operating in an ad-hoc mode. In the BSS 3, there is no access point that functions as a centralized management entity. That is, in the BSS 3, terminals STA 6, STA 7, and STA 8 are managed in a distributed manner. In the BSS 3, all of the terminals STA 6, STA 7, and STA 8 may denote mobile terminals, and access to the distribution system (DS) is not permitted, thus constituting a self-contained network.

The access points STA 2 (AP 1) and STA 5 (AP 2) may provide access to the distribution system (DS) via a wireless medium for the terminals STA 1, STA 3, and STA 4 connected thereto. Communication between the terminals STA 1, STA 3, and STA 4 in the BSS 1 or BSS 2 is generally performed via the access point STA 2 (AP 1) or STA 5 (AP 2), but direct communication may be performed between the terminals STA 1, STA 3, and STA 4 when a direct link is set up therebetween.

Multiple infrastructure BSSs may be connected to each other through the distribution system (DS). The multiple BSSs connected through the distribution system (DS) are called an extended service set (ESS). The entities included in the ESS, that is, STA 1, STA 2 (AP 1), STA 3, STA 4, and STA 5 (AP 2), are capable of communicating with each other, and any terminal STA 1, STA 3, or STA 4 may move from a single BSS to another BSS while performing seamless communication in the same ESS.

The distribution system (DS) is a mechanism for allowing one access point to communicate with another access point. In accordance with the DS, the access point may transmit frames for terminals coupled to a BSS managed thereby, or may transmit frames for any terminal that has moved to another BSS. Further, the access point may transmit and receive frames to and from an external network, such as a wired network. Such a DS is not necessarily a network and is not limited in its form as long as it is capable of providing a predetermined distribution service defined in the IEEE 802.11 standards. For example, the distribution system may be a wireless network such as a mesh network, or a physical structure for connecting the access points to each other.

Each terminal (STA) in the infrastructure BSS may be associated with an access point (AP). When associated with the access point (AP), the terminal (STA) may transmit and receive data.

Figure 3:
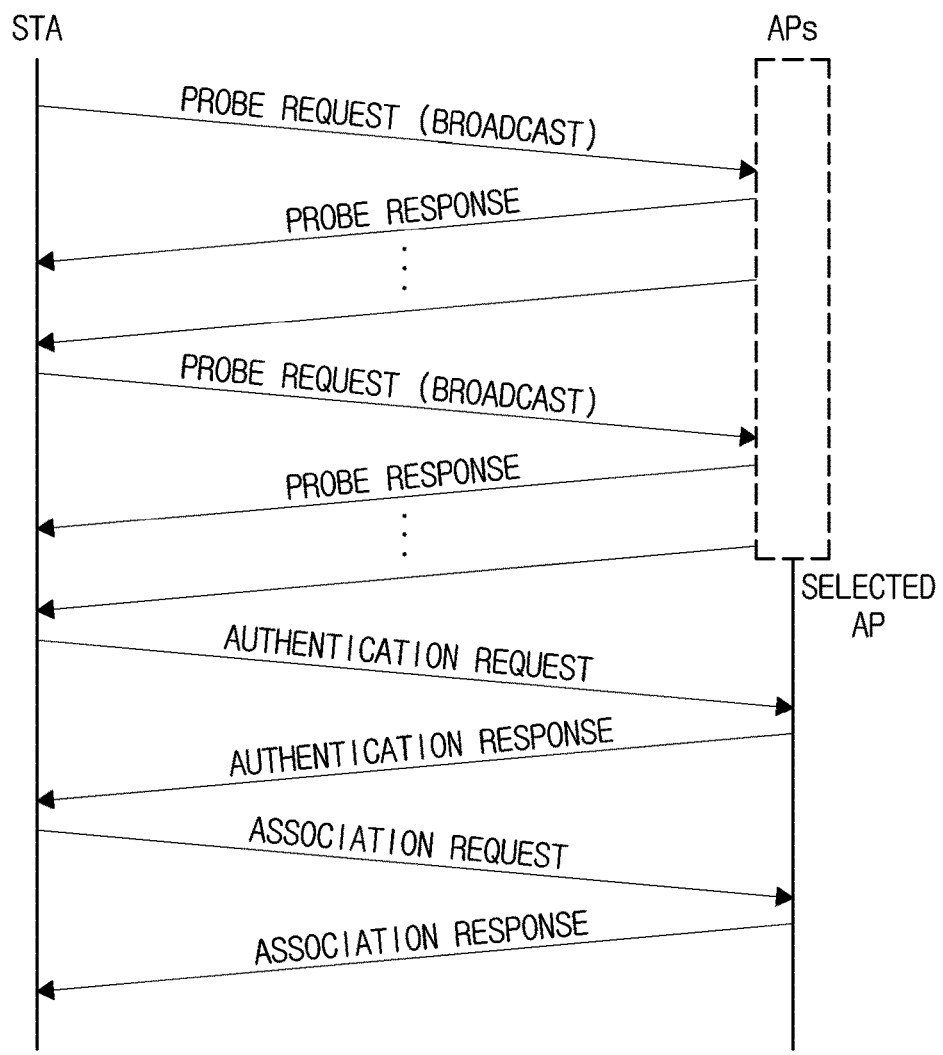
FIG. 3 is a flowchart showing a terminal association procedure in an infrastructure BSS.

FIG. 3 is a flowchart showing a terminal association procedure performed in an infrastructure BSS.

Referring to FIG. 3, the STA association procedure performed in the infrastructure IBSS may be chiefly divided into the step of probing an AP (probe step), the step of performing authentication with the probed AP (authentication step), and the step of associating with the AP with which authentication has been performed (association step).

The terminal (STA) may first probe neighboring APs using a passive scanning method or an active scanning method. When the passive scanning method is used, the terminal (STA) may probe neighboring APs by overhearing the beacons transmitted from the APs. When the active scanning method is used, the STA may probe neighboring APs by transmitting a probe request frame and receiving a probe response frame which is a response to the probe request frame from the APs.

When neighboring APs are detected, the STA may perform the step of performing authentication with each detected AP. In this case, the STA may perform the step of performing authentication with multiple APs. Authentication algorithms conforming to the IEEE 802.11 standards may be classified into an open system algorithm for exchanging two authentication frames with each other and a shared key algorithm for exchanging four authentication frames with each other.

Based on the authentication algorithms conforming to the IEEE 802.11 standards, the STA may transmit an authentication request frame and receive an authentication response frame, which is a response to the authentication request frame, from each AP, thus completing authentication with each AP.

When authentication has been completed, the STA may perform the step of associating with the AP. In this case, the STA may select a single AP from among the APs with which authentication has been performed, and may perform the step of associating with the selected AP. That is, the STA may transmit an association request frame to the selected AP and receive an association response frame, which is a response to the association request frame, from the selected AP, thus completing association with the selected AP.

The WLAN system denotes a local area network in which multiple communication entities conforming to the IEEE 802.11 standards may exchange data with each other in a wirelessly connected state.

Figure 4:
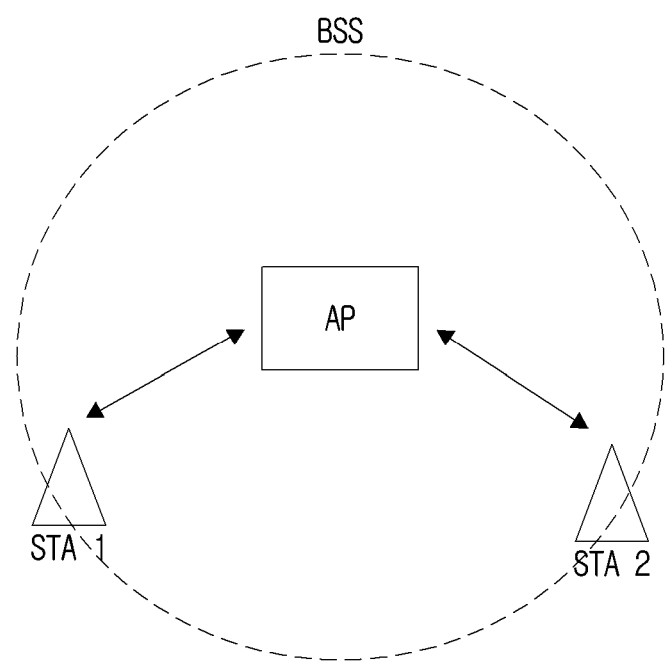
FIG. 4 is a conceptual diagram showing the infrastructure BSS of a WLAN system.

FIG. 4 is a conceptual diagram showing the infrastructure BSS of a WLAN system.

Referring to FIG. 4, the infrastructure BSS may include a single access point (AP) and multiple terminals STA 1 and STA 2. The AP may transmit a beacon frame including a service set ID (SSID), which is a unique identifier, in a broadcast manner. The beacon frame may provide information about the presence and association of the AP to terminals that are not associated with the AP, and may notify the terminals associated with the AP of the presence of data that is transmitted to a specific terminal.

Each terminal that is not associated with the AP may probe the AP using a passive scanning method or an active scanning method, and may acquire association information from the probed AP. In the case of the passive scanning method, the terminal may probe the AP by receiving a beacon frame from the AP. In the case of the active scanning method, the terminal may probe the AP by transmitting a probe request frame and receiving a probe response frame, which is a response thereto, from the AP.

Each terminal that is not associated with the AP may attempt to perform authentication with a specific AP based on association information acquired from the beacon frame or the probe response frame. A terminal that has succeeded in authentication may transmit an association request frame to the corresponding AP, and the AP, having received the association request frame, may transmit an association response frame including the AID of the terminal to the terminal. Via the above procedure, the terminal may be associated with the AP.

Figure 5:
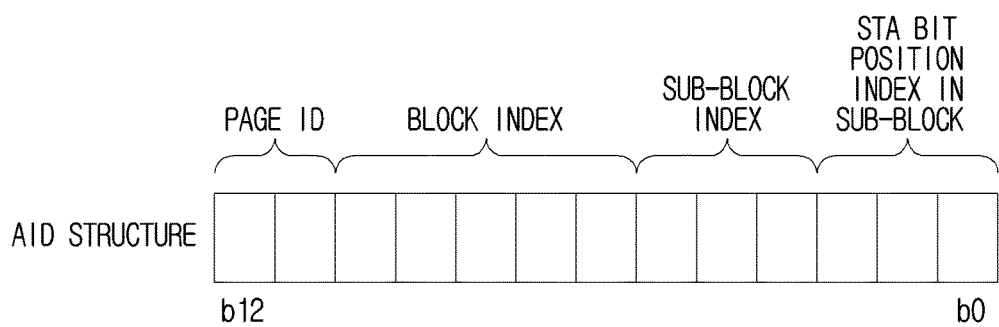
FIG. 5 is a block diagram showing an embodiment of a hierarchical AID structure.

FIG. 5 is a block diagram showing an embodiment of a hierarchical AID structure.

Referring to FIG. 5, in the IEEE 802.11 standards, an AID having a hierarchical structure may be used to efficiently manage multiple terminals. An AID assigned to a single terminal may be composed of a page ID, a block index, a sub-block index, and a terminal index (STA index). The group to which the terminal belongs (i.e. a page group, a block group, or a sub-block group) may be identified using information about individual fields.

FIG. 6 is a block diagram showing an embodiment of the structure of a traffic indication map (TIM) information element (IE).

Referring to FIG. 6, the TIM IE may include an element ID field, a length field, a delivery traffic indication message (DTIM) count field, a DTIM period field, a bitmap control field, and a partial virtual bitmap field. That is, the TIM IE includes information required to indicate a bit corresponding to the AID of a terminal when data to be transmitted to the terminal is buffered in the AP, and this information may be encoded into the bitmap control field and the partial virtual bitmap field.

Figure 7:
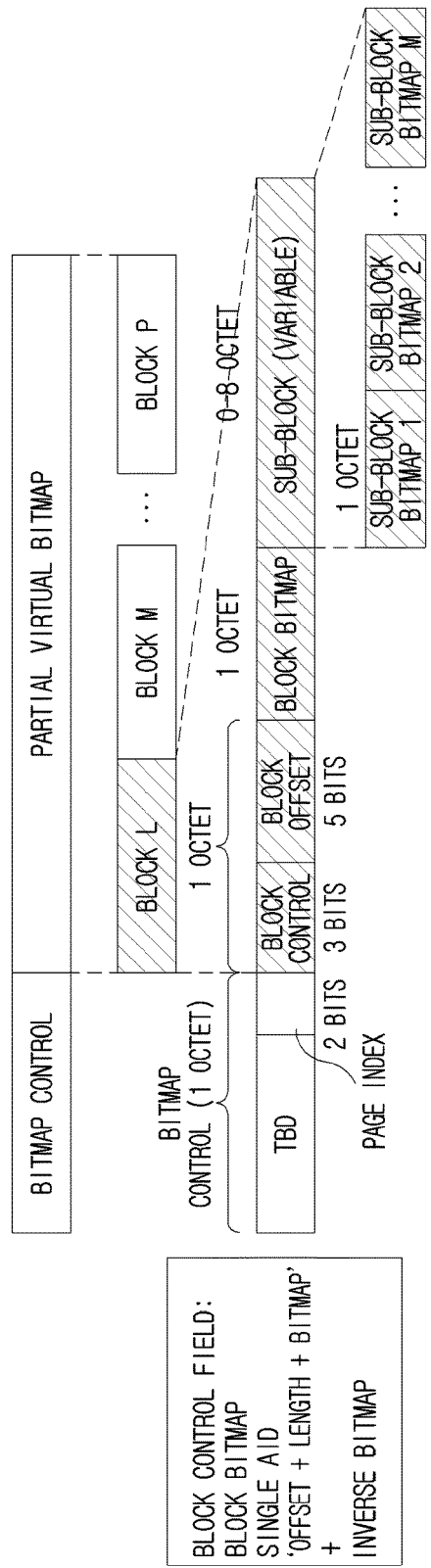
FIG. 7 is a block diagram showing an embodiment of the structure of a TIM encoded on a block basis.

FIG. 7 is a block diagram showing an embodiment of the structure of a TIM encoded on a block basis.

Referring to FIG. 7, in the IEEE 802.11 standards, the TIM may be encoded on a block basis. A single encoding block may include a block control field, a block offset field, a block bitmap field, and at least one sub-block field.

The block control field may denote the encoding mode of the TIM. That is, the block control field may represent a block bitmap mode, a single AID mode, an offset+length+ bitmap (OLB) mode, or an inverse bitmap mode. The block offset field may represent the offset of an encoded block. The block bitmap field may represent a bitmap indicating the location of the sub-block in which an AID bit is set. The sub-block bitmap field may represent a bitmap indicating the location of an AID in the sub-block.

Figure 8:
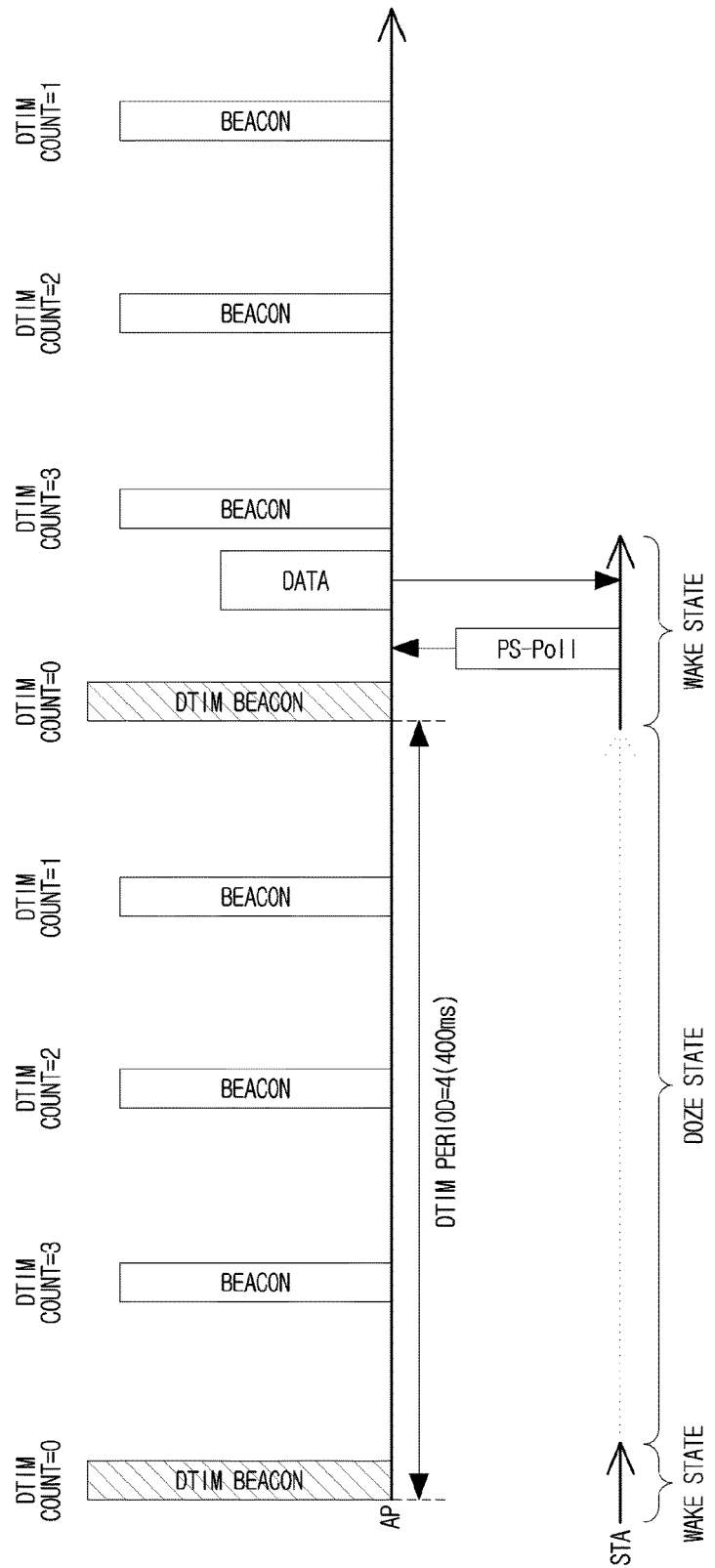
FIG. 8 is a flow diagram showing an embodiment of a data transmission/reception procedure.

FIG. 8 is a flow diagram showing an embodiment of a data transmission/reception procedure.

Referring to FIG. 8, an access point (AP) may transmit a beacon frame including a TIM IE in a broadcast manner. A terminal (STA) operating in a power save mode may awake at intervals of a beacon period, in which a DTIM count becomes 0, and may receive a beacon frame. The terminal (STA) is configured to, when a bit corresponding to its AID is set to '1' in the TIM included in the received beacon frame, transmit a PS-Poll frame to the AP, thus notifying the AP that the STA is ready to receive data. Upon receiving the PS-Poll frame, the AP may transmit a data frame to the corresponding STA.

In the WLAN system, communication entities (i.e. access points, terminals, etc.) share a wireless channel and contend with other entities to access the wireless channel based on a carrier sense multiple access (CSMA)/collision avoidance (CA) scheme. First, each communication entity may check the occupied state of the wireless channel using a physical channel sensing scheme and a virtual channel sensing scheme before accessing the wireless channel.

The physical channel sensing scheme may be implemented via channel sensing, which detects whether energy of a predetermined level or more is present in the wireless channel. When energy of a predetermined level or more is detected using the physical channel sensing scheme, the terminal may determine that the wireless channel is occupied by another terminal, and thus may perform again channel sensing after waiting for a random backoff time. Meanwhile, when energy of less than a predetermined level is detected using the physical channel sensing scheme, the terminal may determine that the wireless channel is in an idle state, and may then access the corresponding wireless channel and transmit a signal through the wireless channel.

The virtual channel sensing scheme may be implemented by setting a predicted channel occupation time using a network allocation vector (NAV) timer. In the WLAN system, upon transmitting a frame, a communication entity may write the time required to complete the transmission of the corresponding frame in the duration field of the header of the frame. When normally receiving a certain frame through the wireless channel, the communication entity may set its own NAV timer based on a value in the duration field of the header of the received frame. When receiving a new frame before the NAV timer has expired, the communication entity may update the NAV timer based on the value in the duration field of the header of the newly received frame. When the NAV timer has expired, the communication entity may determine that the occupation of the wireless channel has been released, and may then contend for access to a wireless channel.

The communication entity may support multiple data rates of a physical layer depending on various modulation schemes and various channel coding rates. Generally, a high data rate for the physical layer enables a large amount of data to be transmitted during a short wireless channel occupation time, but requires high signal quality. In contrast, a low data rate for the physical layer enables data to be transmitted even at low signal quality, but requires a relatively long wireless channel occupation time.

Since the resources of the wireless channel are shared between communication entities, the overall capacity of the WLAN system may be increased only when the maximum amount of data is transmitted during the time for which a specific communication entity occupies the wireless channel. That is, the overall capacity of the WLAN system may be increased when the terminal transmits and receives data to and from the AP at the highest possible data rate for the physical layer. The highest data rate for the physical layer may be realized when signal quality is sufficiently secured owing to a short distance between the AP and the terminal. If the terminals are located far away from the AP, the data rate of the physical layer becomes low, thus resulting in the reduction of the overall capacity of the WLAN system.

In the WLAN system for providing a communication service to multiple sensor terminals located over a wide area, there may occur the case where data cannot be transmitted to the entire area using only the signal output of a single AP. That is, sensor terminals that cannot be supported with a communication service may be present. Meanwhile, since a low-power sensor terminal has low signal output, the range in which the WLAN system is capable of transmitting uplink data may be further narrowed.

In particular, since a terminal located in the coverage boundary of the AP exhibits poor signal quality, the terminal performs communication with the AP at a low data rate of the physical layer. Therefore, the overall capacity of the WLAN system is drastically decreased. Further, when using the low data rate of the physical layer, the low-power terminal must be awake for a much longer time in order to transmit the same amount of data, thus increasing power consumption.

Figure 9:
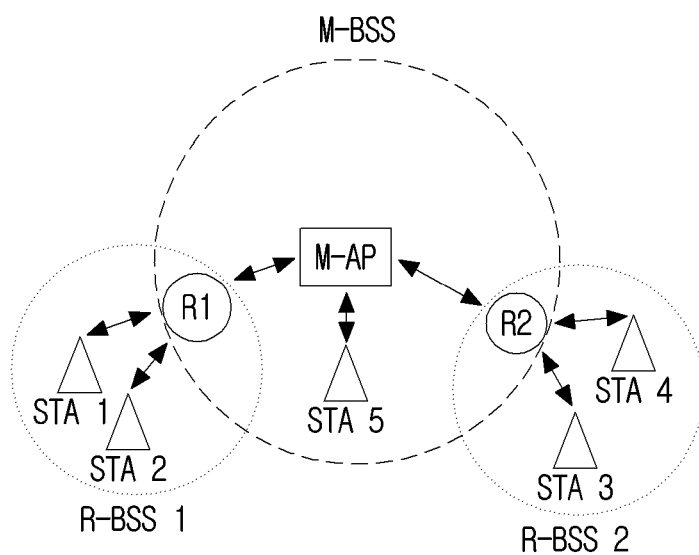
FIG. 9 is a conceptual diagram showing a WLAN system including relay devices.

FIG. 9 is a conceptual diagram showing a WLAN system including relay devices.

Referring to FIG. 9, a master access point (master-AP: M-AP), a first relay device R1, a second relay device R2, and a fifth terminal STA 5 may constitute a master BSS. The first relay device R1, a first terminal STA 1, and a second terminal STA 2 may constitute a first relay BSS. The second relay device R2, a third terminal STA 3, and a fourth terminal STA 4 may constitute a second relay BSS. The relay devices R1 and R2 may be located at the place where signal quality between the master access point (M-AP) and the terminals STA 1, STA 2, STA 3, and STA 4 is deteriorated. The first relay device R1 may relay data transmitted between the master access point (M-AP) and the first and second terminals STA 1 and STA 2. The second relay device R2 may relay data transmitted between the master access point (M-AP) and the third and fourth terminals STA 3 and STA 4. That is, the physical area of the master access point (M-AP) may be extended via the relay devices R1 and R2.

Figure 10:
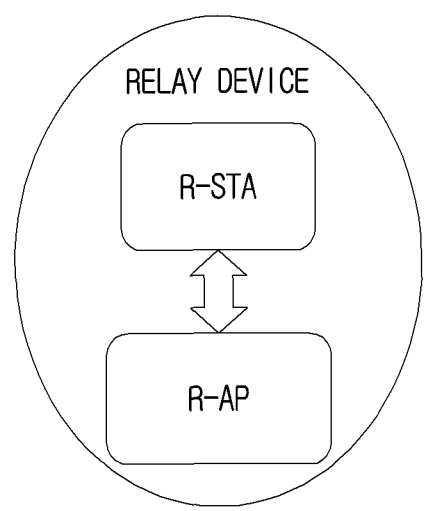
FIG. 10 is a block diagram showing the logical configuration of a relay device.

FIG. 10 is a block diagram showing the logical configuration of a relay device.

Referring to FIG. 10, the relay device may include a relay terminal (R-STA), functioning as a master access point (M-AP), and a relay access point (R-AP), functioning as an access point for terminals in an extended area.

The relay terminal (R-STA) may probe the master access point (M-AP) by receiving a beacon frame or a probe response frame transmitted from the master access point (M-AP) according to the same procedure as a normal terminal. Thereafter, the relay terminal (R-STA) may sequentially perform a procedure for authentication with the probed master access point (M-AP) and a procedure for association with the M-AP.

The relay terminal (R-STA) may relay data transmitted between the master access point (M-AP) and an end terminal. In this case, the relay terminal (R-STA) may relay data that is transmitted using a 4-address field. The 4-address field includes a destination address (DA) field indicating the address of the final destination of data, a source address (SA) field indicating the address of the place where the data was generated, a transmitter address (TA) field indicating the address of the communication entity that physically transmits a frame containing the data, and a receiver address (RA) field indicating the address of the communication entity that is to physically receive the frame containing the data.

For example, when desiring to transmit data to an end terminal via a relay device, the master access point (M-AP) may configure and transmit the header address field of a data frame as follows.

DA field: address of end terminal
SA field: address of master access point (M-AP)
TA field: address of master access point (M-AP)
RA field: address of relay device The relay terminal (R-STA) may forward a data frame received from the relay access point (R-AP) to the master access point (M-AP), and may forward a data frame received from the master access point (M-AP) to the relay access point (R-AP).

When the relay terminal (R-STA) and the master access point (M-AP) are associated with each other and a transfer path is acquired, the relay access point (R-AP) may periodically transmit a beacon frame including an identifier (SSID) identical to that of the master access point (M-AP). Also, the relay access point (R-AP) may transmit a probe response frame in response to a probe request frame from the end terminal, transmit an authentication response frame in response to an authentication request frame from the end terminal, and transmit an association response frame in response to an association request frame from the end terminal. That is, the relay access point (R-AP) may perform the same function as the master access point (M-AP).

An end terminal located near the relay device may be connected to a relay-AP (R-AP) located closer to the end terminal than the master access point (M-AP) and may secure high signal quality, thus enabling data to be transmitted at a high data rate of the physical layer.

The relay access point (R-AP) may generate a beacon frame including an indicator indicating that the R-AP itself is a communication entity for relaying data transmitted between the master access point (M-AP) and the end terminal, and may transmit the generated beacon frame. Such an indicator may be defined either using one bit in the beacon frame or using the address field of the master access point (M-AP).

The relay access point (R-AP) may transmit a data frame using a 4-address field in the same way as the relay terminal (R-STA). Alternatively, the relay access point (R-AP) may transmit a data frame using a 3-address field (SA=TA, RA, and DA) when the SA field is identical to the TA field.

In a WLAN system supporting the access of multiple terminals over a wide area, when the multiple terminals receive a DTIM beacon, they may intensively contend for access to a channel for a short period of time in order to receive data. In this case, collisions between frames frequently occur due to excessive contention for channel access, whereby the incidence of frame retransmission and backoff times are increased, thus increasing power consumption by the terminals. Consequently, the efficiency of use of the wireless channel is deteriorated. This problem may be solved by utilizing a scheduling method that permits or restricts access by a specific terminal to the channel in a predetermined time slot.

Figure 11:
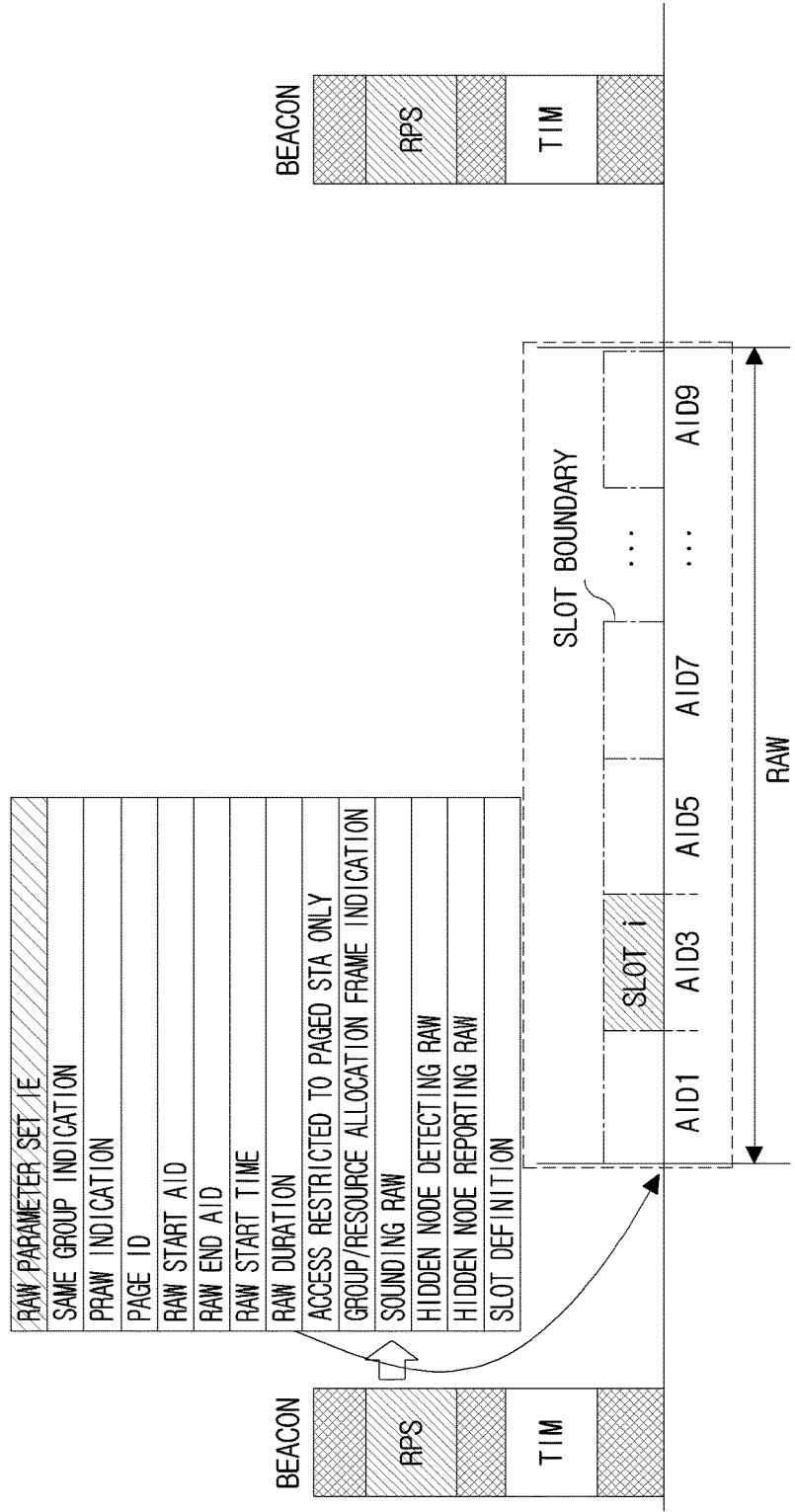
FIG. 11 is a conceptual diagram showing a restricted access window (RAW)-based scheduling method.

FIG. 11 is a conceptual diagram showing a restricted access window (RAW)-based scheduling method.

Referring to FIG. 11, an AP may generate a beacon including RAW parameter set (RPS) information for the scheduling of a terminal. The RPS may include a same group indication field, a periodic RAW (PRAW) indication field, a page ID field, a RAW start AID field, a RAW end AID field, a RAW start time field, a RAW duration field, a field for access restricted to paged STA only, a group/resource allocation frame indication field, a sounding RAW field, a slot definition field, etc. The RPS may further include a hidden node detecting RAW field, a hidden node reporting RAW field, etc.

The AP may define the interval of a RAW as a RAW duration ranging from the RAW start time, and may permit channel access by a designated terminal group between a RAW start AID and a RAW end AID in a page ID. The AP may divide the RAW into multiple time slots depending on the slot definition field, and allocate terminals belonging to a group designated in the corresponding RAW to respective time slots.

A single time slot may have a uniform length, and at least one terminal may be allocated to a single time slot. The method for allocating a terminal to a time slot may be performed in such a way as to separately define a time slot in the slot definition field or to allow the terminal to infer a time slot by itself in conformity with a predetermined rule using the AID location information of the terminal.

Figure 12:
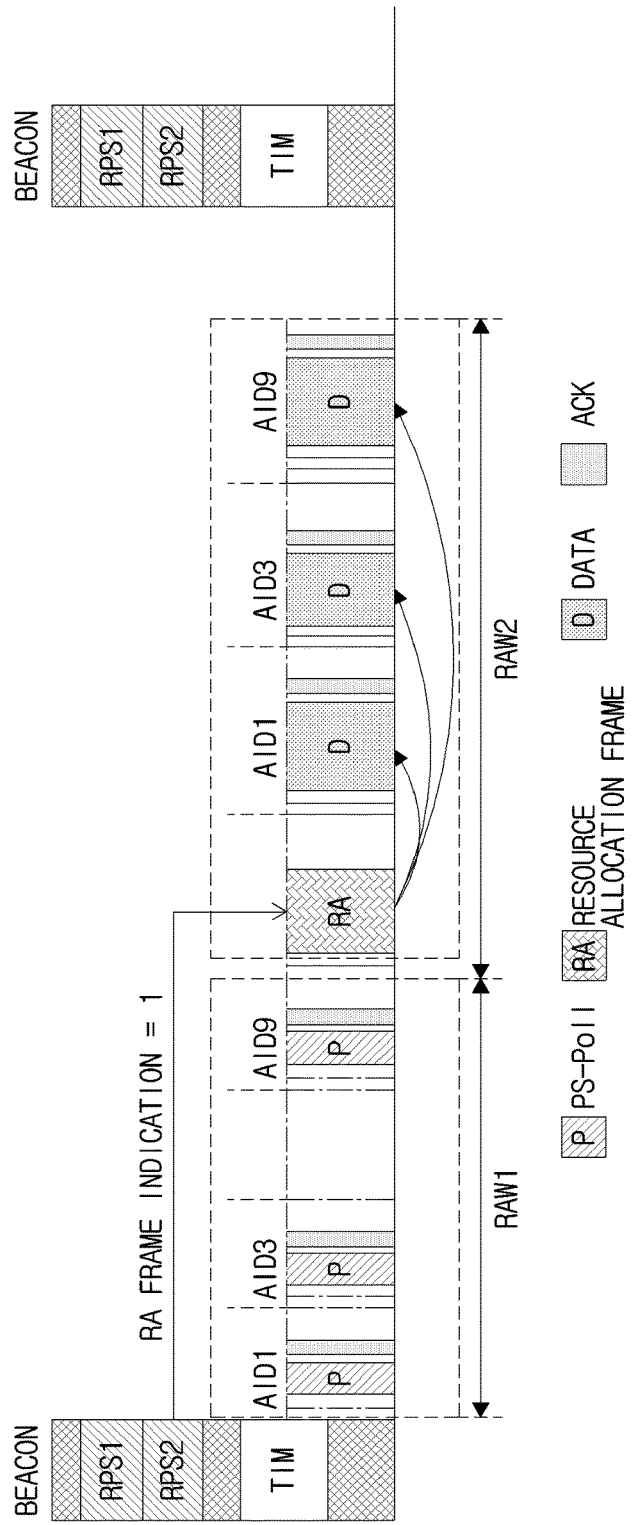
FIG. 12 is a conceptual diagram showing a continuous RAW-based scheduling method.

FIG. 12 is a conceptual diagram showing a continuous RAW-based scheduling method.

Referring to FIG. 12, the AP may generate a beacon including multiple RPSs (i.e. RPS 1 and RPS 2). That is, the AP may set a continuous RAW using RPS 1 and RPS 2. In this case, the AP may indicate that the terminal group of RPS 2 is identical to a terminal group designated by previous RPS1, using the same group indication field included in the RPS2, and may generate RPS2 in which a RAW start AID, an RAW end AID, etc. are omitted, by means of such same group indication field.

The group/resource allocation frame indication field may indicate that a group/resource allocation frame (i.e. RA frame) indicating separate time slot allocation information will be received at the start time of a RAW. By means of such a RAW setting scheme, the AP may allocate a time slot for the transmission of a PS-Poll frame to the terminal during RAW 1, and may allocate a time slot only to the terminal that has transmitted the PS-Poll frame so that actual data may be transmitted during RAW 2.

As described above, when terminals are scheduled to access a channel in a certain time slot, the terminals that simultaneously access the channel immediately after a beacon frame has been received are temporally distributed, and thus the problems of channel access contention and a frame collision may be alleviated by means of temporal distribution.

Meanwhile, a master BSS configured by the master access point (M-AP) and a relay BSS configured by the relay device may use the same channel. However, since beacon frames referred to by terminals belonging to respective BSSs are different from each other, channel access by the terminals connected to a relay device is not restricted due to the RPS included in a beacon frame transmitted from the master access point (M-AP). Therefore, in the WLAN system including the relay device, the channel access operation of terminals connected to the relay device is not effectively controlled using only RPS included in the beacon frame transmitted from the master access point (M-AP).

Figure 13:
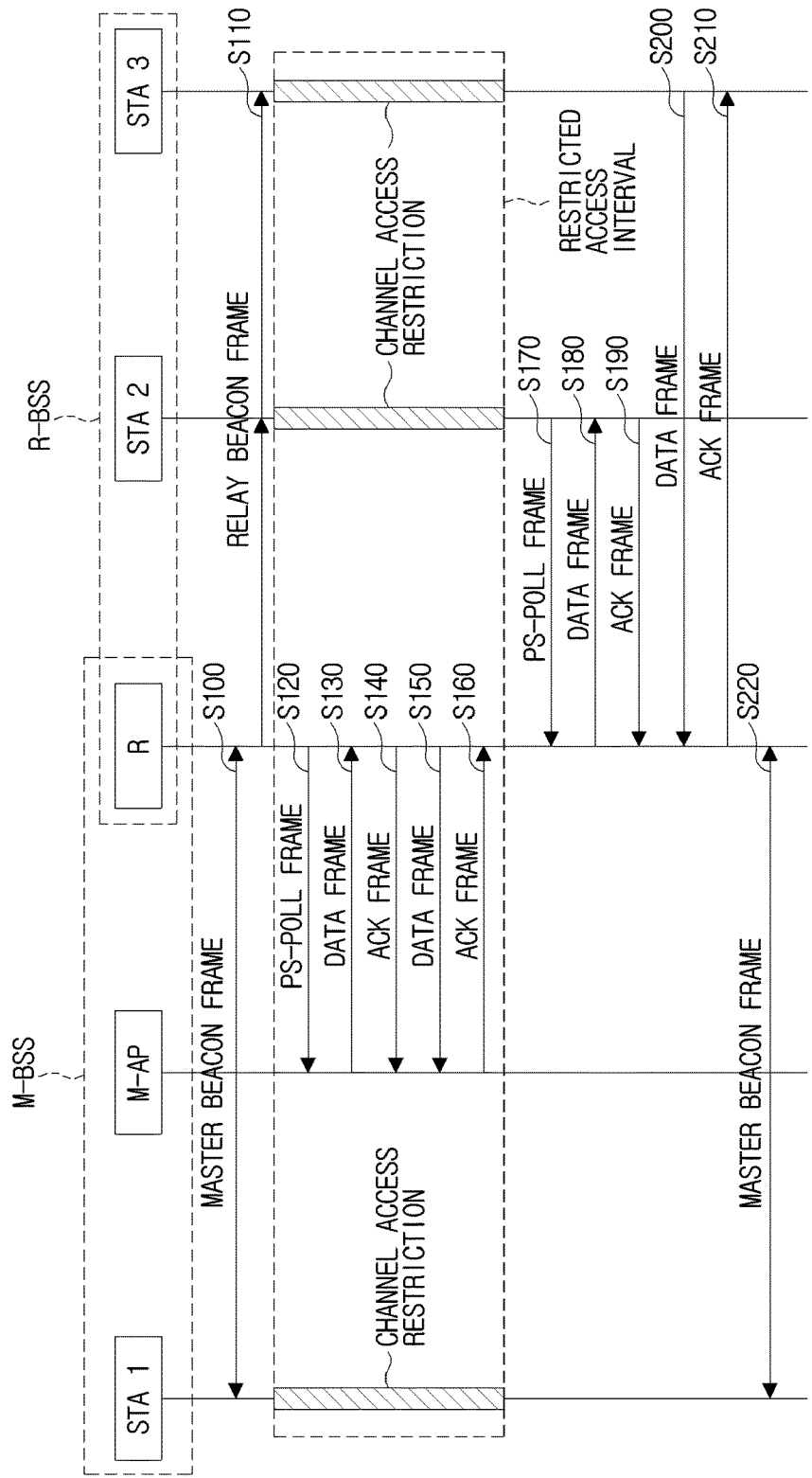
FIG. 13 is a flowchart showing a channel access control method according to an embodiment of the present invention.
Figure 14:
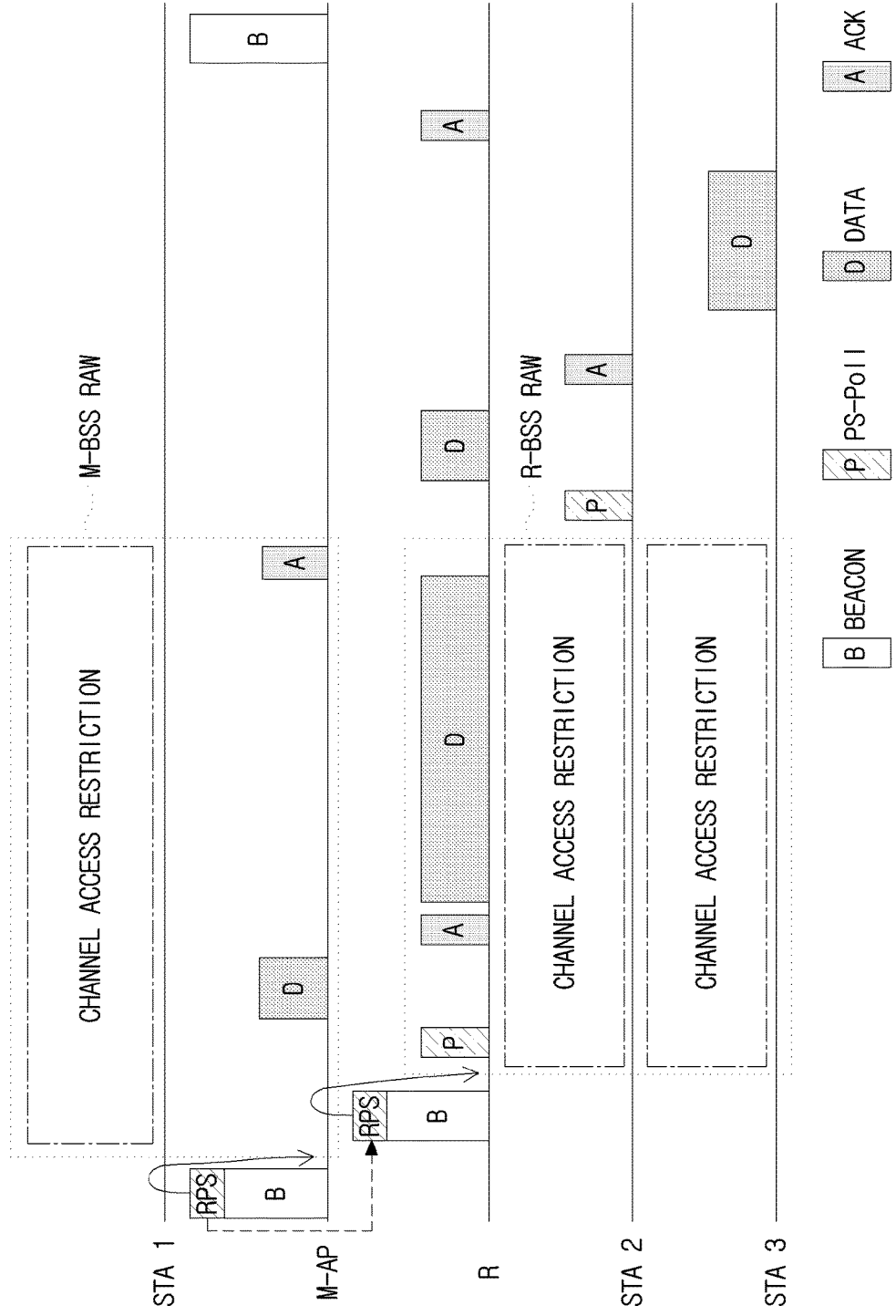
FIG. 14 is a conceptual diagram showing a channel access control method according to the embodiment of the present invention.

FIG. 13 is a flowchart showing a channel access control method according to an embodiment of the present invention, and FIG. 14 is a conceptual diagram showing a channel access control method according to the embodiment of the present invention.

Referring to FIGS. 13 and 14, a master access point (M-AP), a relay device R, and a first terminal STA 1 may constitute an M-BSS. The relay device R, a second terminal STA 2, and a third terminal STA 3 may constitute an R-BSS. Here, the relay device R may denote a relay device such as that described above with reference to FIG. 10. The master access point (M-AP) may generate a master beacon frame including information about a restricted access interval during which channel access by end terminals (i.e. the second terminal STA 2 and the third terminal STA 3) connected to the relay device R is restricted. The restricted access interval information may be included in the RPS of the master beacon frame. Further, the master access point (M-AP) may set multiple restricted access intervals, wherein channel access may be independently restricted in each of the restricted access intervals. The master access point (M-AP) may set each restricted access interval so that the restricted access interval starts after the relay device R has transmitted a relay beacon frame.

FIG. 15 is a conceptual diagram showing the configuration of an RPS included in a master beacon frame according to an embodiment of the present invention.

Referring to FIG. 15, an RPS may include an R-BSS access restriction request field, a same group indication field, a PRAW indication field, a page ID field, a RAW start AID field, a RAW end AID field, a RAW start time field, a RAW duration field, a field for access restricted to paged STA only, a group/resource allocation frame indication field, a sounding RAW field, a slot definition field, etc.

The R-BSS access restriction request field may represent information about a restricted access interval, during which channel access by an end terminal connected to a relay device R is restricted. That is, the R-BSS access restriction request field may represent an indicator indicating that channel access by the end terminal connected to the relay device R is restricted.

Referring back to FIGS. 13 and 14, the master access point (M-AP) may periodically transmit a master beacon frame (S100). The first terminal STA 1 may receive the master beacon frame from the master access point (M-AP), and may not access a channel during the interval indicated by an RPS included in the master beacon frame. Meanwhile, the relay device R may generate a relay beacon frame based on an RPS included in a master beacon frame upon receiving the master beacon frame from the master access point (M-AP). That is, when information about a restricted access interval is included in the RPS of the master beacon frame, the relay device R may generate an RPS that includes an indicator indicating that channel access by an end terminal connected thereto is restricted, the start point of the restricted access interval, and the duration of the restricted access interval, and may generate a relay beacon frame including the generated RPS. Here, the indicator indicating that channel access by the end terminal is restricted may be set based on the R-BSS access restriction request field shown in FIG. 15. The start point of the restricted access interval may be set based on the RAW start time field shown in FIG. 15, and the duration of the restricted access interval may be set based on the RAW duration field shown in FIG. 15.

FIG. 16 is a conceptual diagram showing the configuration of an RPS included in a relay beacon frame according to an embodiment of the present invention.

Referring to FIG. 16, the RPS may include an R-BSS access restriction request field, a RAW start time field, and a RAW duration field. The R-BSS access restriction request field may represent an indicator indicating that channel access by an end terminal connected to a relay device R is restricted, the RAW start time field may represent the start point of the restricted access interval, and the RAW duration field may represent the duration of the restricted access interval.

Referring back to FIGS. 13 and 14, the relay device R may transmit a relay beacon frame (S110). Here, the relay device R may transmit the relay beacon frame immediately after it receives the master beacon frame. The second terminal STA 2 and the third terminal STA 3 belonging to the R-BSS may receive the relay beacon frame, and may not access a channel during the interval indicated by the restricted access interval information (i.e. the indicator indicating that channel access by the end terminal connected to the relay device R is restricted, the start point of the restricted access interval, the duration of the restricted access interval, etc.) when the restricted access interval information is included in the RPS of the relay beacon frame.

Meanwhile, the relay device R may transmit and receive data to and from the master access point (M-AP) during the restricted access interval. For example, the relay device R may transmit a PS-Poll frame to the master access point (M-AP) (S120). When receiving the PS-Poll frame, the master access point (M-AP) may transmit a data frame to the relay device R (S130). When the data frame has been successfully received, the relay device R may transmit an ACK frame, as a response thereto, to the master access point (M-AP) (S140). When there is buffered data, the relay device R may transmit the corresponding data frame to the master access point (M-AP) (S150). When the data frame has been successfully received, the master access point (M-AP) may transmit an ACK frame, as a response thereto, to the relay device R (S160).

When the restricted access interval has ended, the communication entity belonging to the M-BSS and the communication entity belonging to the R-BSS may transmit and receive data to and from each other. For example, the second terminal STA 2 may transmit a PS-Poll frame to the relay device R (S170). When the PS-Poll frame is received, the relay device R may transmit a data frame to the second terminal STA 2 (S180). When the data frame has been successfully received, the second terminal STA 2 may transmit an ACK frame, as a response thereto, to the relay device R (S190). When there is buffered data, the third terminal STA 3 may transmit the corresponding data frame to the relay device R (S200). When the data frame has been successfully received, the relay device R may transmit an ACK frame, as a response thereto, to the third terminal STA 3 (S210).

Figure 17:
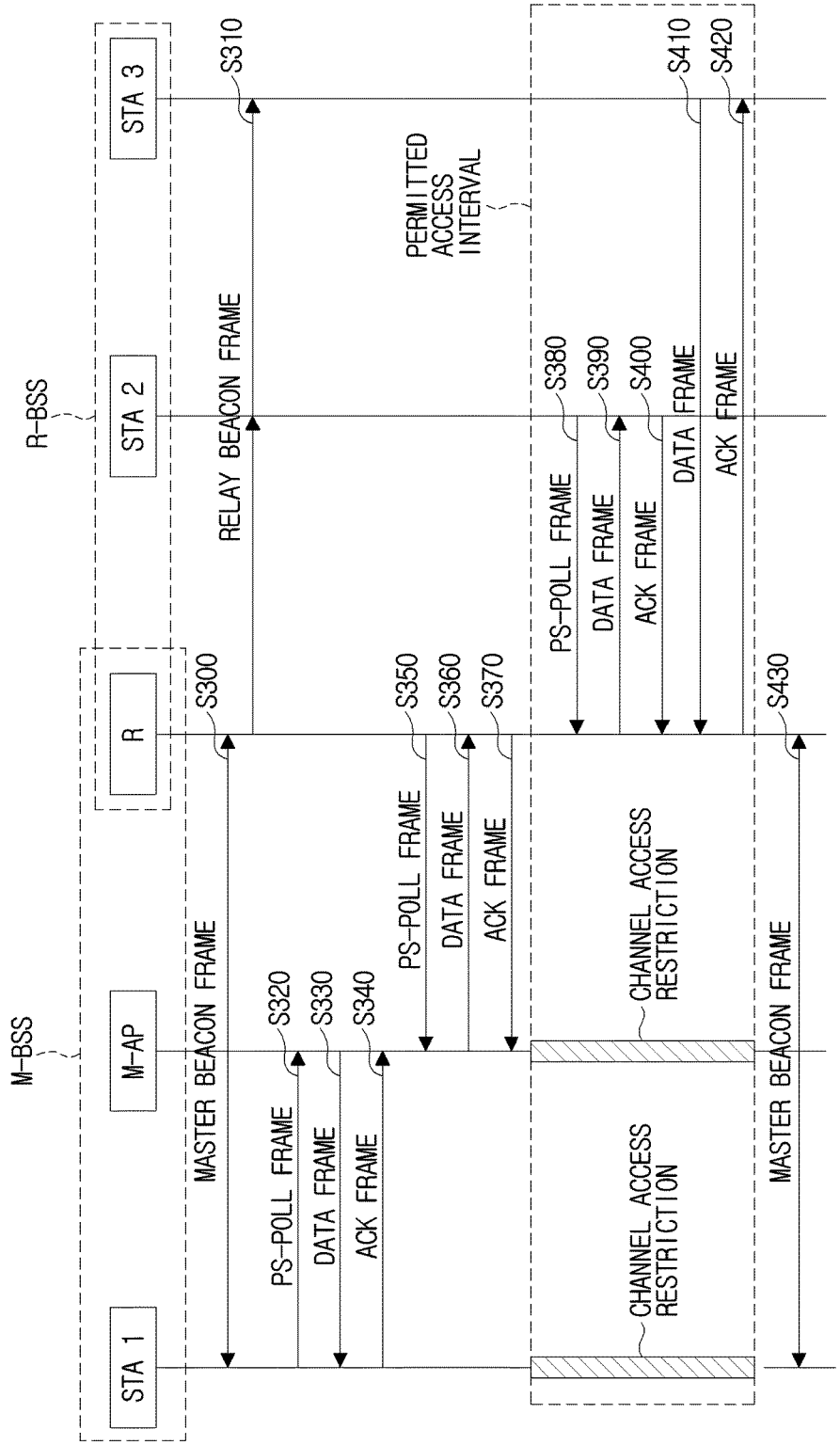
FIG. 17 is a flowchart showing a channel access control method according to another embodiment of the present invention.
Figure 18:
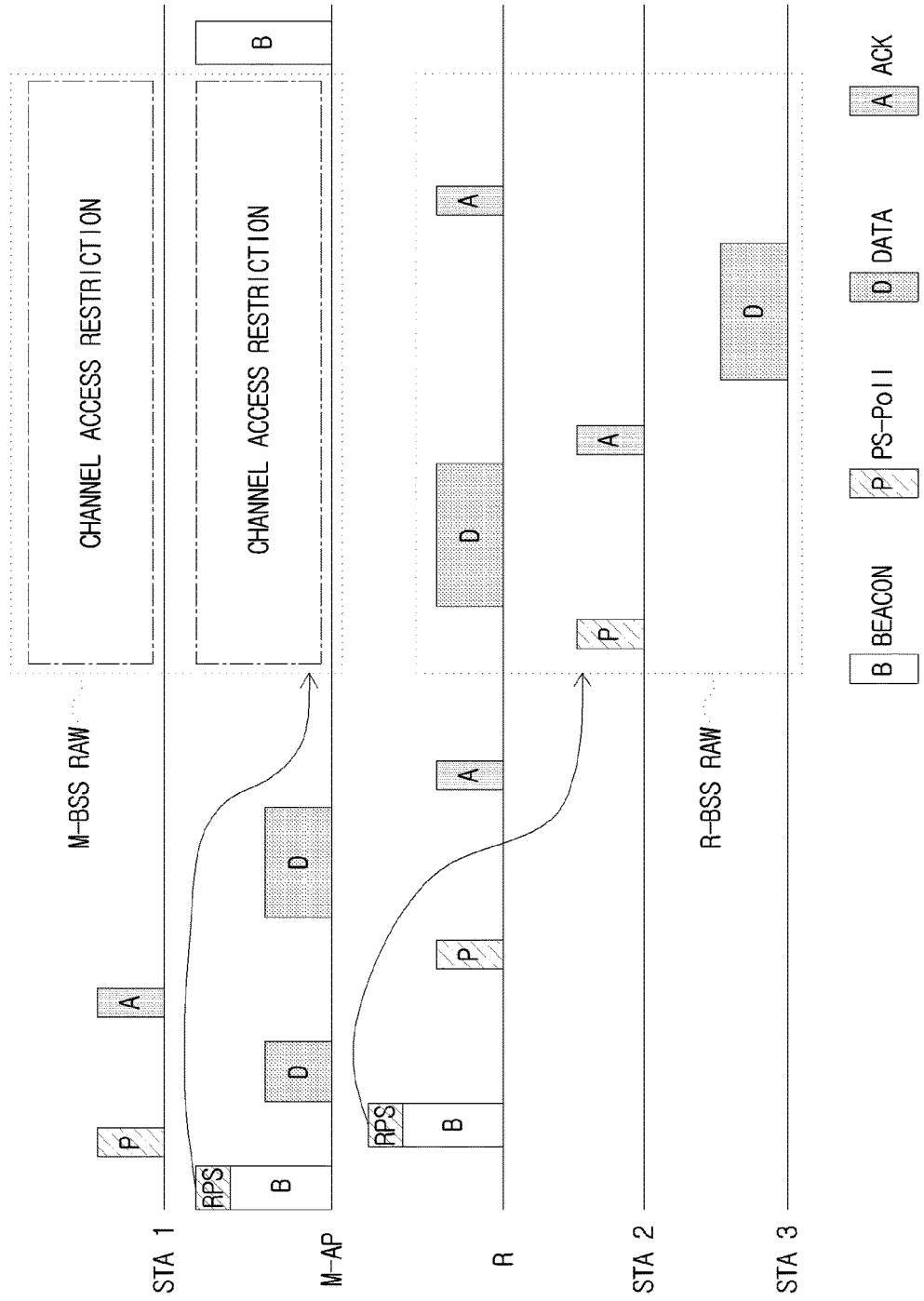
FIG. 18 is a conceptual diagram showing a channel access control method according to the other embodiment of the present invention.

FIG. 17 is a flowchart showing a channel access control method according to another embodiment of the present invention, and FIG. 18 is a conceptual diagram showing a channel access control method according to the other embodiment of the present invention.

Referring to FIGS. 17 and 18, a master access point (M-AP), a relay device R and a first terminal STA 1 may constitute an M-BSS. The relay device R, a second terminal STA 2, and a third terminal STA 3 may constitute an R-BSS. Here, the relay device R may denote the relay device described above with reference to FIG. 10. The master access point (M-AP) may generate a master beacon frame including information about a permitted access interval during which channel access by end terminals (i.e. the second terminal STA 2 and the third terminal STA 3) connected to the relay device R is permitted. The permitted access interval information may be included in the RPS of the master beacon frame. The master access point (M-AP) may set the permitted access interval so that the permitted access interval starts after the relay device R has transmitted a relay beacon frame.

FIG. 19 is a conceptual diagram showing the configuration of an RPS included in a master beacon frame according to another embodiment of the present invention.

Referring to FIG. 19, the RPS may include an R-BSS access permission request field, a same group indication field, a PRAW indication field, a page ID field, a RAW start AID field, a RAW end AID field, a RAW start time field, a RAW duration field, a field for access restricted to paged STA only, a group/resource allocation frame indication field, a sounding RAW field, a slot definition field, etc.

The R-BSS access permission request field may represent information about a permitted access interval during which channel access by an end terminal connected to the relay device R is permitted. That is, the R-BSS access permission request field may represent an indicator indicating that channel access by the end terminal connected to the relay device R is permitted.

Meanwhile, when multiple relay devices are present in an M-BSS, the master access point (M-AP) may control channel access by the end terminal belonging to a specific R-BSS. That is, the master access point (M-AP) may generate a master beacon frame including information about a permitted access interval during which channel access by the end terminal connected to a specific relay device is permitted.

FIG. 20 is a conceptual diagram showing the configuration of an RPS included in a master beacon frame according to a further embodiment of the present invention.

Referring to FIG. 20, the RPS may include an R-BSS access permission request field, a same group indication field, a PRAW indication field, a page ID field, a RAW start AID (relay AID) field, a RAW end AID (relay AID) field, a RAW start time field, a RAW duration field, a field for access restricted to paged STA only, a group/resource allocation frame indication field, a sounding RAW field, a slot definition field, etc.

The R-BSS access permission request field may represent an indicator indicating that channel access by an end terminal connected to a relay device R is permitted. The page ID field, the RAW start AID (relay AID) field, and the RAW end AID (relay AID) field may represent a specific R-BSS, in which channel access is permitted during a permitted access interval. The slot definition field may represent a permitted access interval mapped on a time slot basis for each R-BSS.

Referring back to FIGS. 17 and 18, the master access point (M-AP) may periodically transmit a master beacon frame (S300). The first terminal STA 1 may receive a master beacon frame from the master access point (M-AP) and may not access a channel during an interval indicated by the RPS included in the master beacon frame. Meanwhile, the relay device R may generate a relay beacon frame based on the RPS included in a master beacon frame when the master beacon frame is received from the master access point (M-AP). That is, when information about a permitted access interval is included in the RPS of the master beacon frame, the relay device R may generate an RPS including an indicator indicating that the channel access of an end terminal connected thereto is permitted, the start point of the permitted access interval, and the duration of the permitted access interval, and may generate a relay beacon frame including the generated RPS. Here, the indicator indicating that channel access by the end terminal is permitted may be set based on the R-BSS access permission request field shown in FIG. 19 or 20. The start point of the permitted access interval may be set based on the RAW start time field shown in FIG. 19 or 20, and the duration of the permitted access interval may be set based on the RAW duration field shown in FIG. 19 or 20.

Meanwhile, when the RPS of the master beacon frame indicates that access by the end terminal belonging to a specific R-BSS is permitted (i.e. R-BSS indicated by the page ID field, the RAW start AID (relay AID) field, and the RAW end AID (relay AID) field shown in FIG. 20), the relay device constituting the specific R-BSS may transmit a relay beacon frame including information about the permitted access interval, but a relay device constituting an R-BSS other than the specific R-BSS cannot transmit a relay beacon frame including information about the permitted access interval. That is, the relay device constituting the R-BSS other than the specific R-BSS may restrict channel access by the end terminal connected thereto during the permitted access interval.

FIG. 21 is a conceptual diagram showing the configuration of an RPS included in a relay beacon frame according to another embodiment of the present invention.

Referring to FIG. 21, an RPS may include an R-BSS access permission request field, a RAW start time field, and a RAW duration field. The R-BSS access permission request field may represent an indicator indicating that channel access by an end terminal connected to a relay device R is permitted, the RAW start time field may represent the start point of a permitted access interval, and the RAW duration field may represent the duration of the permitted access interval.

Referring back to FIGS. 17 and 18, the relay device R may transmit a relay beacon frame (S310). Here, the relay device R may transmit the relay beacon frame immediately after receiving the master beacon frame. Meanwhile, communication entities belonging to the M-BSS may transmit and receive data during intervals other than the permitted access interval. For example, the first terminal STA 1 may transmit a PS-Poll frame to the master access point (M-AP) (S320). When receiving the PS-Poll frame, the master access point (M-AP) may transmit a data frame to the first terminal STA 1 (S330). When the data frame has been successfully received, the first terminal STA 1 may transmit an ACK frame, as a response thereto, to the master access point (M-AP) (S340). Also, the relay device R may transmit a PS-Poll frame to the master access point (M-AP) (S350). When the PS-Poll frame is received, the master access point (M-AP) may transmit a data frame to the relay device R (S360). When the data frame has been successfully received, the relay device R may transmit an ACK frame, as a response thereto, to the master access point (M-AP) (S370).

Meanwhile, the second terminal STA 2 and the third terminal STA 3 belonging to the R-BSS may receive a relay beacon frame, and may access a channel during an interval indicated by permitted access interval information when the permitted access interval information (i.e. the indicator indicating that channel access by the end terminal connected to the relay device R is permitted, the start point of the permitted access interval, the duration of the permitted access interval, etc.) is included in the RPS of the relay beacon frame.

For example, the second terminal STA 2 may transmit a PS-Poll frame to the relay device R during the permitted access interval (S380). When the PS-Poll frame is received, the relay device R may transmit a data frame to the second terminal STA 2 (S390). When the data frame has been successfully received, the second terminal STA 2 may transmit an ACK frame, as a response thereto, to the relay device R (S400). When there is buffered data, the third terminal STA 3 may transmit the corresponding data frame to the relay device R (S410). When the data frame has been successfully received, the relay device R may transmit an ACK frame, as a response thereto, to the third terminal STA 3 (S420).

The embodiments of the present invention may be implemented in the form of program instructions that are executable via various types of computer means, and may be recorded on a computer-readable medium. The computer-readable medium may include program instructions, data files, and data structures solely or in combination. Program instructions recorded on the computer-readable medium may have been specially designed and configured for the embodiments of the present invention, or may be known to or available to those who have ordinary knowledge in the field of computer software.

Examples of the computer-readable storage medium include all types of hardware devices specially configured to store and execute program instructions, such as read only memory (ROM), random access memory (RAM), and flash memory. The hardware devices may be configured to operate as one or more software modules in order to perform the operation according to embodiments of the present invention, and vice versa. Examples of the program instructions include machine language code, such as code created by a compiler, and high-level language code executable by a computer using an interpreter or the like.

Although the present invention has been described with reference to the embodiments, those skilled in the art will appreciate that the present invention can be modified and changed in various forms, without departing from the spirit and scope of the invention as disclosed in the accompanying claims.

The invention claimed is:

1. A method for channel access control being performed by a relay device for relaying data that is transmitted between a master access point and an end terminal, the method comprising:
   receiving, from the master access point, a master beacon frame including information about a restricted access interval during which channel access by the end terminal connected to the relay device is not allowed;
   generating a relay beacon frame based on the master beacon frame,
   wherein the relay beacon frame is different from the master beacon frame, and
   wherein the relay beacon frame includes the information about the restricted access interval; and
   transmitting the relay beacon frame to the end terminal.

2. The method of claim 1, wherein the information about the restricted access interval includes an indicator indicating that channel access by the end terminal connected to the relay device is not allowed, a start point of the restricted access interval, and a duration of the restricted access interval.

3. The method of claim 1, wherein the information about the restricted access interval is included in a restricted access window (RAW) parameter set.

4. The method of claim 1, further comprising transmitting and receiving data to and from the master access point during the restricted access interval.

5. The method of claim 1, wherein channel access by a terminal associated with the master access point is not allowed during the restricted access interval.

6. The method of claim 1, wherein channel access by the end terminal connected to the relay device is not allowed during the restricted access interval.

7. The method of claim 1, wherein the relay device is configured to relay first data from the master access point to the end terminal, and to relay second data from the end terminal to the master access point.

8. The method of claim 1, the master beacon frame corresponds to a master basic service set (BSS), and the relay beacon frame corresponds to a relay BSS different from the master BSS, and
   wherein the end terminal belongs to the relay BSS, and
   wherein the end terminal does not belong to the master BSS.

9. The method of claim 8, wherein the master BSS includes the master access point and the relay device, and
   wherein the relay BSS includes the relay device and the end terminal.

10. The method of claim 1, wherein the master access point is configured to
    determine the restricted access interval so that the restricted access interval begins after the relay device transmits the relay beacon frame.

11. The method of claim 1, wherein the relay device is configured to relay first data from the master access point to the end terminal, and to relay second data from the end terminal to the master access point.

* * * * *